(12) United States Patent
Auburger et al.

(10) Patent No.: US 8,833,300 B2
(45) Date of Patent: *Sep. 16, 2014

(54) MILKING OF AN ANIMAL WITH REDUCED TEAT STRESS

(75) Inventors: Markus Auburger, Lippstadt (DE); Martin Neumann, Oelde (DE); Thomas Rohring, Dortmund (DE)

(73) Assignee: Gea Farm Technologies GmbH, Bönen (DE)

( * ) Notice: Subject to any disclaimer, the term of this patent is extended or adjusted under 35 U.S.C. 154(b) by 755 days.

This patent is subject to a terminal disclaimer.

(21) Appl. No.: 12/152,000

(22) Filed: May 12, 2008

(65) Prior Publication Data

US 2008/0289579 A1 Nov. 27, 2008

Related U.S. Application Data

(60) Provisional application No. 60/928,847, filed on May 11, 2007.

(51) Int. Cl.
*A01J 5/04* (2006.01)
(52) U.S. Cl.
USPC ....................................... 119/14.51
(58) Field of Classification Search
USPC .......... 119/14.01–14.07, 14.09, 14.18, 14.19, 119/14.21, 14.37, 14.47, 14.51, 14.52, 119/14.54, 14.55
See application file for complete search history.

(56) References Cited

U.S. PATENT DOCUMENTS

| | | | |
|---|---|---|---|
| 289,546 A | 12/1883 | Martin | |
| 870,785 A | 11/1907 | Jacques | |
| 970,816 A | 9/1910 | Hankins | |
| 1,111,978 A * | 9/1914 | Uebler | 119/14.31 |
| 1,358,667 A * | 11/1920 | Williams et al. | 119/14.55 |
| 1,700,025 A | 1/1929 | Cockburn | |
| 1,822,680 A * | 9/1931 | Taylor | 119/14.53 |
| 2,099,884 A | 11/1937 | Green | |
| 2,690,734 A | 10/1954 | Heckendorf | |
| 2,694,379 A * | 11/1954 | Hein | 119/14.47 |
| 3,212,681 A | 10/1965 | Weikert | |
| 3,461,845 A * | 8/1969 | Peterson | 119/14.18 |
| 4,324,201 A | 4/1982 | Larson | |
| 4,745,881 A * | 5/1988 | Larson | 119/14.51 |
| 4,756,275 A * | 7/1988 | Larson | 119/14.49 |
| 4,869,205 A * | 9/1989 | Larson | 119/14.51 |
| 4,924,809 A * | 5/1990 | Verbrugge | 119/14.02 |

(Continued)

FOREIGN PATENT DOCUMENTS

| | | |
|---|---|---|
| DE | 3217865 | 1/1983 |
| DE | 3429428 | 11/1985 |

(Continued)

OTHER PUBLICATIONS

English language Translated Description and Claims of WO 01/84913 A1, European Patent Office's esp@cenet.com database, 6pp.

(Continued)

*Primary Examiner* — Isam Alsomiri
*Assistant Examiner* — Ebony Evans
(74) *Attorney, Agent, or Firm* — Smith Law Office; Jeffry W. Smith

(57) ABSTRACT

A milking unit comprising a milk-collecting component and at least two milk tubes which are connected to the milk-collecting component.

6 Claims, 15 Drawing Sheets

(56) References Cited

U.S. PATENT DOCUMENTS

| | | | |
|---|---|---|---|
| 5,080,041 A | | 1/1992 | Steingraber |
| 5,435,916 A | | 7/1995 | Schwartz |
| 5,572,947 A | * | 11/1996 | Larson et al. ............... 119/14.51 |
| 5,848,738 A | * | 12/1998 | Sundby et al. ................ 222/380 |
| 5,934,222 A | | 8/1999 | Hwang |
| 6,039,001 A | | 3/2000 | Sanford |
| 6,427,624 B1 | | 8/2002 | Briggs et al. |
| 6,895,891 B2 | * | 5/2005 | Maier et al. ................ 119/14.51 |
| 6,997,136 B1 | | 2/2006 | Coates |
| 7,121,590 B1 | | 10/2006 | Alveby |
| 7,395,780 B2 | | 7/2008 | Maier, Jr. et al. |
| 7,578,260 B2 | * | 8/2009 | Shin ............................ 119/14.52 |
| 7,637,228 B2 | | 12/2009 | Hatzack et al. |
| 7,650,854 B2 | | 1/2010 | Petterson et al. |
| 7,827,933 B2 | | 11/2010 | Van Den Berg |
| 2004/0025794 A1 | * | 2/2004 | Maier et al. ................ 119/14.51 |
| 2007/0137582 A1 | | 6/2007 | Boast |
| 2008/0276871 A1 | | 11/2008 | Auburger et al. |
| 2008/0289579 A1 | | 11/2008 | Auburger et al. |
| 2009/0050062 A1 | | 2/2009 | Auberger et al. |
| 2010/0126422 A1 | | 5/2010 | Auberger et al. |
| 2010/0275849 A1 | | 11/2010 | Wulle et al. |

FOREIGN PATENT DOCUMENTS

| | | |
|---|---|---|
| DE | 102 07 955 A1 | 9/2003 |
| DE | 102 12 161 A1 | 10/2003 |
| EP | 1 872 653 A1 | 1/2008 |
| GB | 552476 | 4/1943 |
| GB | 784008 | 10/1957 |
| GB | 1197747 | 7/1970 |
| GB | 2145915 | 4/1985 |
| WO | WO 00/76299 A1 | 12/2000 |
| WO | WO 00/76300 A1 | 12/2000 |
| WO | WO 01/84913 A1 | 11/2001 |
| WO | WO 03/069981 A1 | 8/2003 |
| WO | WO2007/022950 | 3/2007 |

OTHER PUBLICATIONS

English language Abstract of corresponding WO 03/69981, Translated Description and Claims of DE 102 07 955 A1, European Patent Office's esp@cenet.com database, 9pp.

English language Abstract of corresponding WO 03/077644, Translated Description and Claims of DE 102 12 161 A1, European Patent Office's esp@cenet.com database, 6pp.

PCT/IB/338, Notification of Transmittal of Translation of the International Preliminary Report on Patentability received Dec. 31, 2009, 1p.

PCT/IB/373, International Preliminary Report on Patentability received Dec. 31, 2009, 1p.

PCT/ISA/237, Translated Written Opinion of the International Searching Authority received Dec. 31, 2009, 5pp.

Restriction Requirement dated Nov. 21, 2011; U.S. Appl. No. 12/451,408.

* cited by examiner

MILKING OF AN ANIMAL WITH REDUCED TEAT STRESS

This application claims the benefit of Provisional Application No. 60/928,847 filed May 11, 2007.

FIELD AND BACKGROUND OF THE INVENTION

The subject matter of the invention concerns a milk tube, a milking unit comprising a milk-collecting component and at least two milk tubes which are connected to the milk-collecting component, a teat cup comprising a teat cup sleeve in which a teat rubber is arranged, and a milk tube which is connected to the teat rubber, and also a teat cup cluster comprising a milk-collecting component, at least two teat cups which each have a teat cup sleeve and a teat rubber arranged in the teat cup sleeve, and milk tubes which connect the teat cups to the milk-collecting component.

Although the invention is described below in conjunction with the milking of cows, it is pointed out that the subject matter of the invention is suitable in particular for use when milking sheep, goats, llamas, camels, dromedaries, buffalo, mares, donkeys, yaks and other lactating animals. The invention can be used both in robot-assisted milking installations and also in fully automatic, semi-automatic and conventional milking installations.

In order to milk an animal, the teat cups have to be attached to the teats of an animal. The attaching of the teat cups may take place with robot assistance. It is also known for teat cups to be attached manually to the teats of the animal. The teat cups have a teat rubber which is arranged in a teat cup sleeve. The teat rubber is connected to a milk tube.

Embodiments are known in which the milk tube is connected directly to a milk transport line, i.e. without the interconnection of a milk-collecting component.

Teat cup clusters comprising teat cups and a milk-collecting component are known. WO 01/84913 discloses a teat cup cluster which has a milk-collecting component. The milk-collecting component has connectors connected to milk tubes. The milk tubes are connected at their other ends to teat cups. In the teat cup cluster configuration disclosed by WO 01/84913 A1, the milk tubes are designed as wavy tubes. Further embodiments of teat cup clusters are known, for example, from the publications DE-A1-102 12 161, WO-A1-00/76299 and WO-A1-00/76300.

The teat cup clusters described in these publications have collecting components which have connectors to which the milk tubes are connected.

DE-A1-102 07 955 discloses another embodiment of a teat cup cluster. The teat cup cluster comprises a milk-collecting component and milk tubes. The one end of each milk tube is connected to the milk-collecting component and the other end to a teat cup. The milk-collecting component has openings. An end region of a milk tube is introduced into each opening thus producing a fluid-tight connection between the milk tube and the milk-collecting component.

The milk tubes are connected to the milk-collecting component in such a manner that a defined kinking is achieved. The kinking is intended essentially to ensure that the milk tube is sealed when the teat cups are not attached to the teats. For this purpose, according to DE-A1-102 07 955, a kink element is provided with a bending edge which is spaced apart from the connecting region of the milk tube and defines a bending region in the milk tube.

U.S. Pat. No. 5,080,041 discloses a bent milk tube by means of which the stressing of the milk tube at the connector of the milk-collecting component is intended to be reduced.

It is known that the physiognomy of the udder, in particular of the teats, may be formed very differently from type of animal to type of animal, from breed to breed and from animal to animal. It is also known that, for example, the distances of the front teats from each other are different than the distances between the rear teats. Account is taken of this fact by means of appropriate matching of the distances between the connectors to the milk-collecting component. Furthermore, it is known that teat cups may have a different design or weight in order better to be matched to the animals.

SUMMARY OF THE INVENTION

Taking this as the starting point, the present invention is based on the aim of indicating a milk tube which has improved properties.

The milk tube according to the invention is distinguished in that it has, at least one end, a clamping body which is of essentially spherical design. The clamping body has a region with an essentially partially cylindrical circumferential surface. By means of this configuration of the milk tube according to the invention, a milk tube with improved properties is provided. In the case of the milk tube according to the invention with a correspondingly designed clamping body, the surfaces serving as sealing surfaces in the fitted state of the milk tube are designed as parts of the ball surface. These surface sections therefore also permit an improved matching or orientation of the milk tube relative to a milk-collecting component.

A configuration of the milk tube is preferred, in which the centre point of the clamping body is offset with respect to the longitudinal axis of the milk tube. If the clamping body is a clamping body which is of essentially spherical design, then the centre point of the clamping body is offset with respect to the longitudinal axis of the milk tube. This achieves an improved overlapping of the clamping body in the fitted state, since said offset leads to an improved introduction of force and to a greater variability with respect to the selection of position. If the clamping body is fixed by a clamping jaw which is essentially designed in the form of a ball socket, then the offset of the centre point of the ball leads to a significantly better overlapping of the clamping body from above with the same ball diameter. This leads, in particular, to a larger movement clearance being achieved in the region of the sealing surfaces. A central introduction of force to the milk-collecting component in the direction of the axis of symmetry of a clamping jaw which serves as the second sealing surface is thus ensured in many positions.

If it is required for the clamping body to be essentially completely surrounded in order to securely and reliably lock the milk tube in a certain position, then it would be necessary for the clamping body, which is of essentially spherical design, to be completely or virtually completely surrounded. However, this leads to the configuration of a milk-collecting component with corresponding clamping jaws becoming correspondingly large and unwieldy. It is therefore proposed, according to a further advantageous configuration of the milk tube according to the invention, that the circumferential surface is of essentially elliptical design.

The effect already achieved by the fact that the section is of essentially cylindrical design is that the size of the clamping body can be reduced to a certain extent. The effect achieved with an elliptical configuration of the region is that the clamping body is narrower laterally, which is better for the dimensioning of the clamping unit. At the same time, the essentially upwardly directed, greater radius of the ellipse means that the supporting border of the clamping body is increased in the region of greatest stress. The latter occurs, for example, when the milk tube is connected to a teat cup and said milk tube hangs downwards. The supporting border lies in the engagement region of the clamping jaw of the clamping unit, said supporting border being greater than in the case of a simple cylindrical section. The risk of the clamping body slipping out of a clamping unit under stress is thus also minimized.

According to another objective, the present invention is based on the aim of providing a milking unit comprising a milk-collecting component and at least two milk tubes connected to the milk-collecting component, which milking unit permits a further improvement in matching it to animals.

This object is achieved according to the invention by a milking unit comprising a milk-collecting component and at least two milk tubes connected to the milk-collecting component.

The milking unit according to the invention has a milk-collecting component and at least two milk tubes connected to the milk-collecting component. The milking unit according to the invention is distinguished in that the at least one releasable clamping connection is provided for fixing at least one milk tube relative to the milk-collecting component, the clamping connection comprising at least two clamping jaws between which a clamping body which is formed on the end region of the milk tube can be positioned.

By means of this configuration of the milking unit according to the invention, forces and moments which are introduced by the milk tube into a teat cup connected to the milk tube are reduced. This is achieved in that the adjustable, in particular, articulated, connection enables matching to the animals to be milked, and therefore the angle at which the milk tube is connected to the collecting component can be changed in a positive manner. Orientation is also achieved by the connection between the milk-collecting component and the at least one milk tube. The clamping connection is configured to be lockable. This creates the possibility, preferably in situ, i.e. in the dairy cattle farm, of undertaking a matching of the milking unit to the animals to be milked. This is advantageous in particular if the herd is essentially homogeneous.

Within a dairy cattle farm, there also may be several groups of milking stalls which have the milking units according to the invention. Within a group of milking stalls, the milking units can be configured in such a manner that they have the same pre-settings in respect of the angle of the teat cups in relation to the milk-collecting component. The milking units within at least one other group can have milking units, the angular adjustment of which differs from the angular adjustment of at least one other group. Improved matching can be achieved by pre-sorting the animals, and therefore animals, the teats of which are formed on the udder in an essentially similar or identical manner, are assigned to the one group and animals, the teats of which are configured differently with regard to the shape and/or arrangement in relation to the udder, are assigned to at least one other group. This measure simplifies the milking operation within the dairy cattle farm, in particular the fitting of the teat cups on to the teats of the animal.

By means of the configuration according to the invention of the milking unit, the forces to which the teats are subjected during milking are reduced, since the articulated connection, which is lockable, enables a specific orientation of the teat cups to be achieved. In particular, the effect achieved by the specific orientation of the teat cups connected to the milk tube is that said teat cups are oriented as far as possible in the direction of the teat axis.

In order further to improve the orientation of the milk tube relative to the collecting component, it is proposed that the clamping connection is designed in such a manner that, when the clamping connection is released, the end region of the milk tube has at least two degrees of freedom.

According to another advantageous configuration of the milking unit according to the invention, it is proposed that the clamping connection has a spherical clamping body and clamping jaws, with the spherical clamping body being connected to the milk tube. The clamping jaws serve for locking purposes, and therefore, after a certain angle is set, the milk tube is fixed in this position on the milk-collecting component. The joint is immovable in the fixed state. The clamping force has to be reduced or eliminated in order to change the angle set. It is not compulsory for the clamping jaw to be of two-part design. It is sufficient if the clamping jaw is of single-part design. The clamping jaw may be formed on the milk-collecting component. The clamping jaw may be formed as a single piece, for example, with a cover of a milk-collecting component. In the case of a two-part clamping jaw, the one part of the clamping jaw is preferably formed on the milk-collecting component while the other part of the clamping jaw forms part of a clamping unit by means of which the clamping body is fixed to the milk-collecting component.

The lockable configuration of the connection can be achieved both by means of a form-fitting connection and by means of a frictional connection. In order to set an angle, a minimum force may have to be overcome if, for example, a correspondingly configured, form-fitting connection is present between the spherical clamping body and the at least one clamping jaw, which connection is achieved, for example, by latching means. This configuration is advantageous not only in the case of a clamping connection with a spherical clamping body. It is also advantageous in the case of differently configured clamping connections.

A configuration is particularly preferred, in which the spherical clamping body is an integral component of the milk tube.

According to another advantageous configuration of the milking unit according to the invention, it is proposed that the spherical clamping body is formed from a material which differs from the material of the milk tube. In particular, the spherical clamping body and the milk tube can be produced by the multi-component injection method, in particular by the two-component injection method.

The preferably spherical clamping body preferably has a larger diameter than the outside diameter of the milk tube. In particular, it is proposed that the clamping body has a diameter which is between 1.2 and 3 times the outside diameter of the milk tube, in particular the outside diameter of the milk tube in the region of the transition to the clamping body. In this case, a diameter of the clamping body that corresponds approximately to 1.4 times the diameter of the milk tube is particularly preferred. The preferably spherical clamping body is preferably designed in such a manner that it has an opening which is directed towards the interior of the milk-collecting component and by means of which the outlet of the milk tube is connected to the interior of the milk-collecting component. The clamping body is pressed by at least one part of the clamping jaw or a clamping unit into the other clamping jaw of the milk-collecting component such that a tight transition arises between the milk tube and the collecting component. Infinitely variable adjustability of the milk tube is possible in particular owing to the rotational symmetry of the ball with respect to the horizontal orientation.

It is not compulsory for the centre point of the spherical clamping body to lie on a longitudinal axis of the milk tube. A configuration in which an eccentric arrangement is formed is preferred.

A design of the clamping connection is particularly preferred, in which the centre point of the ball is displaced with respect to the connection to the milk-collecting component, in particular upwards, from the longitudinal axis of the milk tube, i.e. away from the milk-collecting component.

According to another advantageous embodiment of the milking unit according to the invention, it is proposed that the spherical clamping body and/or at least one clamping jaw has and/or have macrostructures which engage in corresponding recesses, as a result of which an angular adjustment in discrete steps is possible. Furthermore, stops can be provided, as a result of which adjustability of the angle is limited to a defined range. Different angular adjustments or orientations of individual or all of the milking tubes relative to the milk-collecting component can also be achieved by at least one clamping jaw being formed as an exchangeable clamping jaw. Furthermore, there is the possibility of changing the angular adjustment by interchanging the clamping jaws. If, for example, a milk-collecting component with four connections for milk tubes is considered, a changed angular adjustment can be achieved by interchanging the clamping jaws, as viewed, for example, in the clockwise direction of the connecting points for the milk tubes.

According to another advantageous configuration of the milking unit, it is proposed that at least one milk tube is designed in such a manner that a longitudinal axis of the milk tube intersects an axis of articulation of the joint at an angle different than 90°.

In this case, a configuration of the milk tube such that the latter has a clamping body by means of which the milk tube can be fixed to the milk-collecting component is particularly preferred.

The clamping body preferably has an essentially polygonal, in particular, a circular cross section.

According to another advantageous configuration of the milking unit, it is proposed that the milk tube has at least one section of curved design. In this case, a configuration in which the at least one section is formed adjacent to the milk-collecting component is particularly preferred.

To simplify the adjustability of the at least two clamping connections, it is proposed that they have a common clamping unit.

According to another advantageous configuration of the milking unit, it is proposed that the latter has at least two milk tubes which are connected to the milk-collecting component in an articulated manner. The longitudinal axes of the milk tubes in the region of the connection between the milk tube and the collecting component describe a theoretical cone with an opening angle. The cone does not have to be formed within the strict mathematical meaning. The longitudinal axes of two adjacent milk tubes enclose an angle which is smaller than an opening angle of the cone. The articulated connection is preferably lockable.

According to another inventive concept, a teat cup comprising a teat cup sleeve in which a teat rubber is arranged, and a milk tube which is connected to the teat rubber are proposed, with the connection between the teat rubber and the milk tube being formed by a lockable joint.

According to another inventive concept, a teat cup cluster comprising a milk-collecting component, at least two teat cups which each have a teat cup sleeve and a teat rubber arranged in the teat cup sleeve, and milk tubes which connect the teat cups to the milk-collecting component are proposed, with at least one first articulated connection being provided between a milk tube and the milk-collecting component and a second articulated connection being provided between a milk tube and the milk-collecting component, with at least one articulated connection being lockable.

By means of the present invention, the shearing forces acting on the teat attachment are at least reduced, if not even entirely avoided. The present invention provides the possibility of carrying out an individual setting for each cow. Should the farmer not wish to set the teat cup cluster for each individual cow, he can alternatively realize at least one setting which is individual to a group of animals. Furthermore, the interchangeability of the individual components of a teat cup cluster is achieved by the invention. In particular, as a result of the fact that at least one clamping jaw is interchangeable, a considerable reduction in costs for the protection of the milking unit is achieved. Individual clamping jaws may be replaced, for example, by being interchanged, with the newly used clamping jaws permitting different angular adjustments. Furthermore, there is the possibility, as already explained above, that an angular adjustment can be changed by interchanging the jaws.

Further details and advantages of the invention are explained with reference to the exemplary embodiments illustrated in the drawing, without the subject matter of the invention being restricted to these specific exemplary embodiments.

DETAILED DESCRIPTION OF THE PREFERRED EMBODIMENTS

Figure 1:
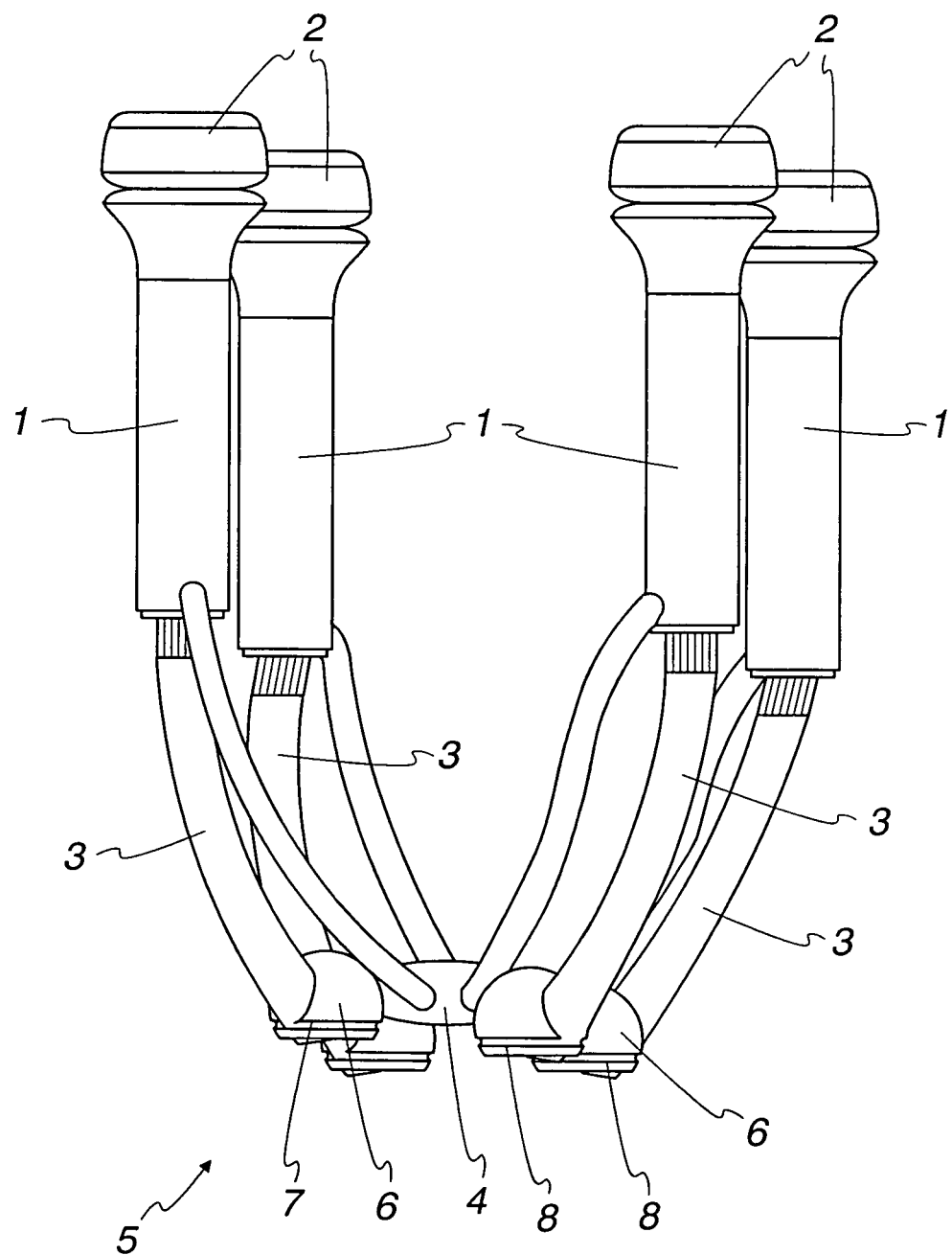
FIG. 1 shows, in a perspective view, a teat cup cluster.

FIG. 1 shows an exemplary embodiment of a teat cup cluster for milking cows. The teat cup cluster comprises teat cups 1 which have teat rubbers 2. Milk tubes 3 are connected to the teat cups. The opposite ends of the milk tubes 3 are connected to a milk-collecting component (not illustrated) in a manner such that they can be adjusted relative to the milk-collecting component. In the exemplary embodiment illustrated according to FIG. 1, the connection of the milk tubes 3 to the milk-collecting component is a clamping connection.

There is the possibility for not all of the milk tubes to be connected to the milk-collecting component by means of clamping connections. There is the possibility of different clamping connections being provided for the connection between the milk tubes and the milk-collecting component. Furthermore, there is the possibility that only a predetermined number of milk tubes are connected to the milk-connecting component in an articulated manner. For example, two milk tubes can be connected to the milk-collecting component in an articulated manner while the two other milk tubes are connected rigidly to the milk-collecting component.

Furthermore, the clamping connections between the milk tubes and the milk-collecting component can be designed in such a manner that the pivotability of individual or of a plurality of milk tubes relative to one another is configured differently.

In the exemplary embodiment illustrated in FIG. 1, the milk tubes 3 are connected via a respective clamping connection. The clamping connection 5 has a first clamping jaw 6 and a second clamping jaw 8. The second clamping jaw 8 is formed on the milk-collecting component (not illustrated). A correspondingly shaped, spherical clamping body 7 engages in the clamping jaw 8. A clamping unit 4 is provided in order to lock the joint. The first clamping jaws 8 are connected to the clamping unit 4. There is the possibility of providing a separate clamping unit 4 for each clamping connection between a milk tube 3 and the milk-collecting component. However, there is also the possibility of some or all of the clamping connections being locked by means of a common clamping unit.

Figure 2:
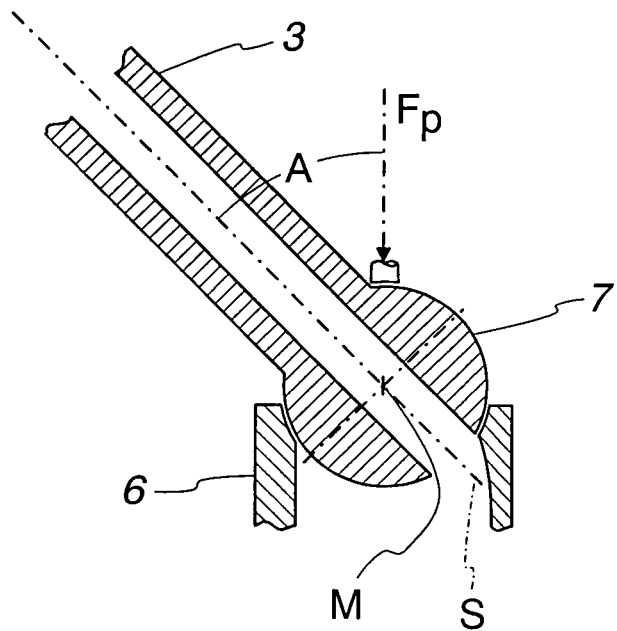
FIG. 2 shows, in section, an exemplary embodiment of a clamping connection.

FIG. 2 illustrates a clamping connection between a milk tube 3 and a milk-collecting component in section and schematically. The connection has a clamping jaw 6 in which the spherical clamping body 7 is arranged. A spherical clamping body within the meaning of the invention can also be formed by a ball or by a spherical element which is connected fluidically to the milk tube. The spherical clamping body may be a separate component which is connected to the milk tube in a form-fitting and/or frictional manner. However, a configuration is preferred in which the spherical clamping body is an integral component of the milk tube 3, as is apparent from FIG. 2 and FIG. 3.

The angle A can be adjusted in a vertical plane by means of the clamping connection. In view of the fact that the clamping connection has three degrees of freedom, the possibility is created of achieving a precise orientation of the milk tube and therefore also of the teat cup.

For the locking and for the fluid-tight connection between the milk tube 3 and the milk-collecting component, not illustrated in FIG. 2, a force $F_P$ is exerted on the spherical clamping body 7.

It is apparent from the illustration according to FIG. 2 that the diameter of the spherical clamping body 7 is larger than the outside diameter of the milk tube. The diameter of the spherical clamping body preferably corresponds approximately to 1.2 to 3 times the outside diameter of the milk tube. It has proven to be particularly advantageous for the diameter of the spherical clamping body preferably to correspond approximately to 1.4 times the outside diameter of the milk tube. If the clamping body is composed of a thermoplastic, then the diameter of the clamping body can also be selected to be smaller than the diameter of the milk tube.

The reference sign S refers to the longitudinal axis of the milk tube 3. The reference sign M characterizes the centre point of the spherical clamping body 7. In the embodiment illustrated in FIG. 2, the centre point M of the spherical clamping body 7 lies on the longitudinal axis S such that the milk tube is of essentially rotationally symmetrical design at least in the region of the clamping connection.

Figure 3:
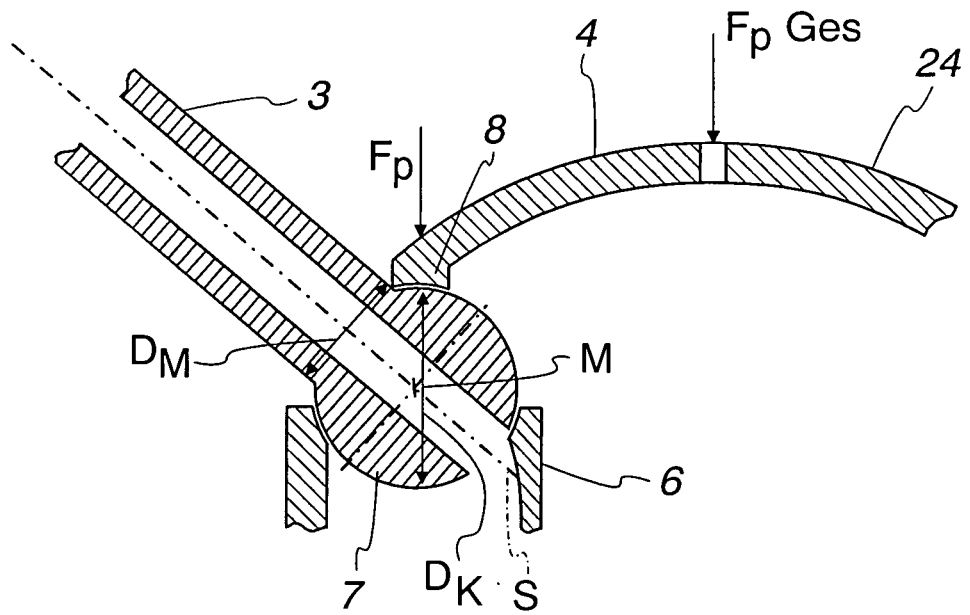
FIG. 3 shows, in section, the configuration of a clamping connection with a clamping unit.

FIG. 3 shows a further exemplary embodiment of a clamping connection between a milk tube 6 and a milk-collecting component (not illustrated). The milk-collecting component has a first clamping jaw 6 in which a spherical clamping body 7 engages. The spherical clamping body 7 is connected to the milk tube 3. It is apparent from the illustration according to FIG. 3 that the centre point M of the spherical clamping body does not lie on the longitudinal axis S of the milk tube 3. The latter is displaced upward, i.e. away from the milk-collecting component (not illustrated). The clamping jaw is preferably configured such that it has as large an opening as possible, and such that there is a small sealing surface which is as defined as possible.

The clamping jaw and the spherical clamping body are preferably designed in terms of flow in such a manner that the flow resistance is as small as possible. The clamping jaw may have corresponding guiding surfaces by means of which the milk flowing from the milk tube into the milk-collecting component experiences a preferred direction of flow.

The spherical clamping body and/or the clamping jaw can be provided with micro and/or macrostructures by means of which the spherical clamping bodies and the clamping jaw can be pivoted relative to one another in discrete steps. The micro and/or macrostructures can be formed by corresponding projections and recesses.

It is apparent from FIG. 3 that the clamping connection can be locked by means of a clamping unit. In the exemplary embodiment illustrated, the clamping unit 4 has a supporting body 24 which is provided with corresponding clamping jaws 8, which is not compulsory but is advantageous. In this case, a force is exerted on the spherical clamping body 7 via the clamping unit 4, causing a fluid-tight connection between the spherical clamping body 7 and the clamping jaw 8 on the milk-collecting component. The clamping jaws 8 can be connected pivotably, preferably rotatably, to the supporting body 24 such that the clamping jaws can take up different positions, to be precise, independently of the position of the supporting body 24. By this means, any manufacturing-induced tolerances can also be compensated for.

Figure 4:
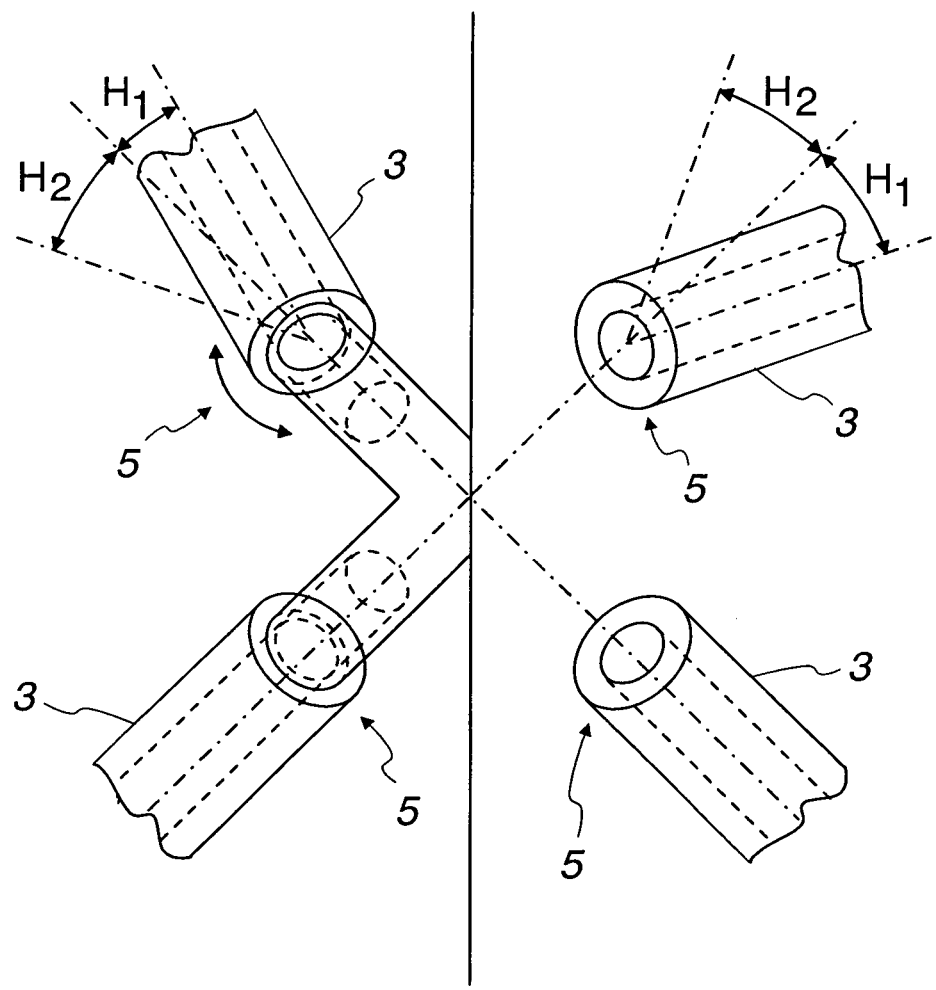
FIG. 4 shows, schematically, the pivotability of milk tubes in a plane.

Release of the clamping unit 4 enables individual or all of the connections to be released such that individual or all of the milk tubes can be adjusted with respect to one another and with respect to the milk-collecting component. FIG. 4 shows, in a top view, milk tubes 5 which are oriented differently from one another such that an optimum setting is achieved for the animals to be milked. Angles about which the individual milk tubes can be deflected are referred to by the designations H1 and H2.

Figure 5:
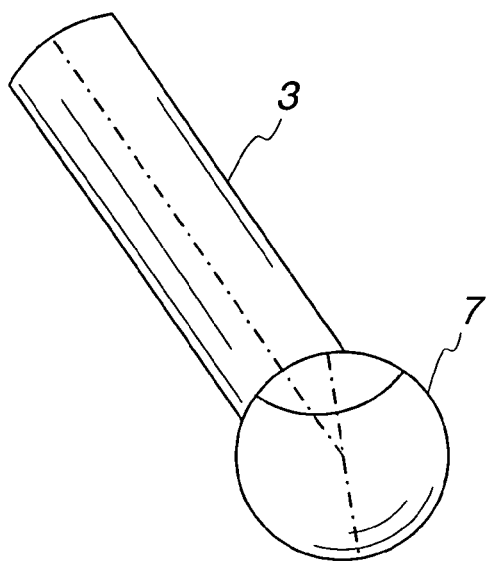
FIG. 5 shows, perspectively, a first embodiment of a milk tube with a spherical clamping body.
Figure 6:
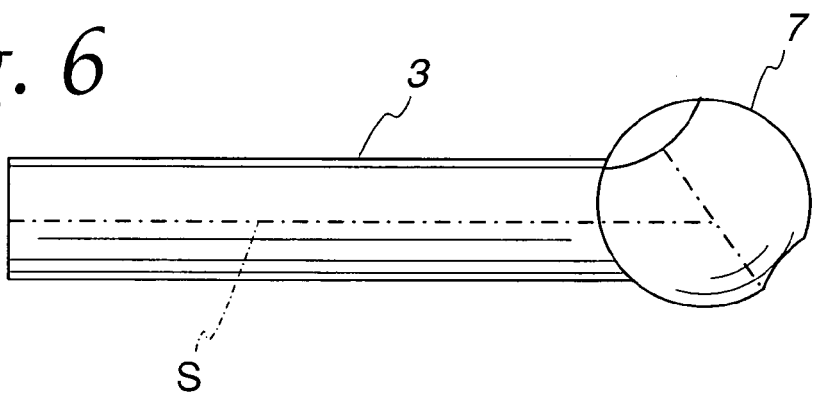
FIG. 6 shows the milk tube according to FIG. 5 in a front view.
Figure 7:
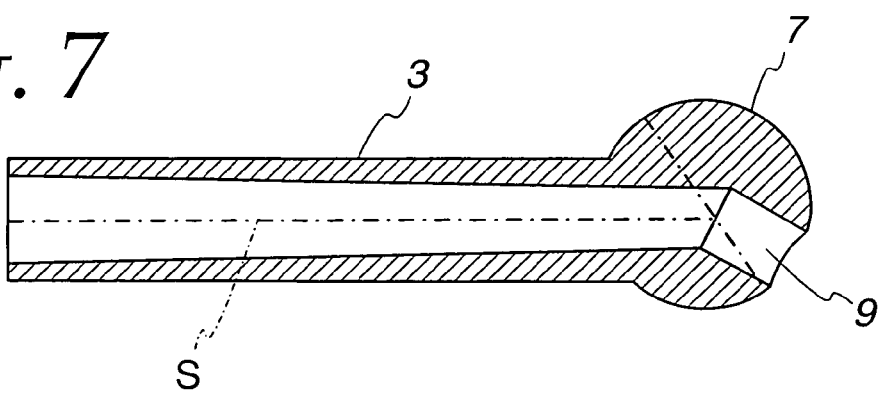
FIG. 7 shows the milk tube according to FIG. 6 in section.

FIGS. 5 to 7 show one embodiment of a milk tube 3. The milk tube 3 has a spherical clamping body 7 at its one end. The centre point of the spherical clamping body 7 does not lie on the longitudinal axis S of the milk tube, thereby achieving a greater overlapping by means of a clamping unit which introduces the sealing force into the spherical clamping body 7. Furthermore, it is apparent from the illustration according to FIG. 7 that the mouth 9 in the spherical clamping body 7 is inclined in relation to the longitudinal axis S. The effect which can be achieved by this is that the diameter of the spherical clamping body can be reduced, with it being possible to achieve sufficiently large overlapping with the clamping jaw.

Figure 8:
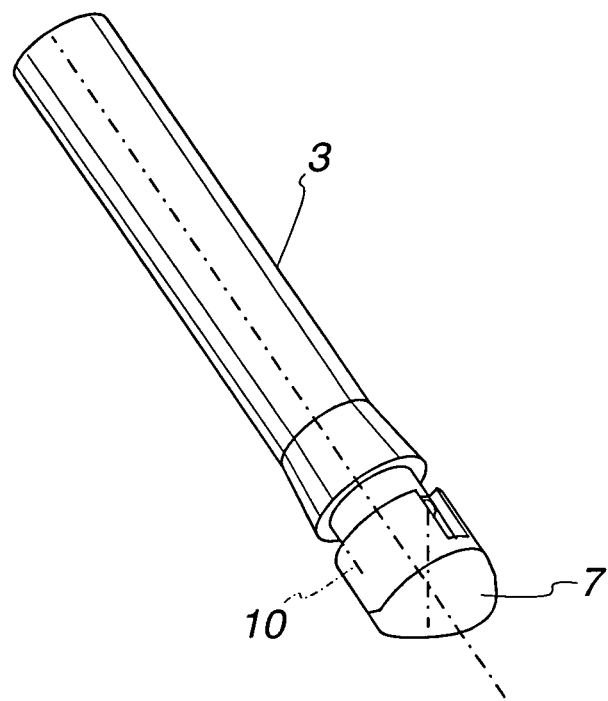
FIG. 8 shows a second exemplary embodiment of a milk tube in a perspective view.
Figure 9:
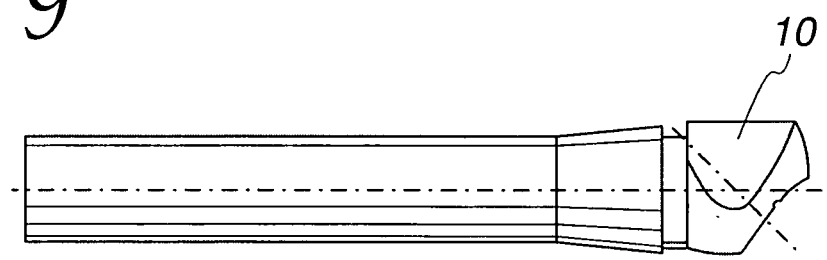
FIG. 9 shows the milk tube according to FIG. 8 in a front view.
Figure 10:
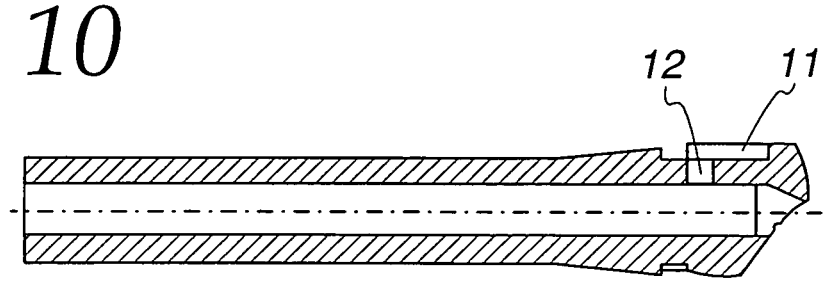
FIG. 10 shows the milk tube according to FIG. 9 in section.

FIGS. 8 to 10 illustrate another exemplary embodiment of a milk tube. The milk tube 3 has a spherical clamping body 7. The spherical clamping body 7 has a region 10 which is of essentially cylindrical design. A groove 11 is provided within the region 10. Better demouldability at least of the spherical clamping body 7 is achieved by the groove 11. Furthermore, a recess 12 is provided into which a correspondingly complementary part can be introduced, as a result of which the milk tube can be fixed to the milk-collecting component in a defined position.

A corresponding projection which has formed on the clamping jaw can also engage in the groove 11. If the projection engages in the groove, then the milk tube can take up a predetermined defined position. If the clamping jaw is pivotable, preferably rotatable, then the clamping jaw is positioned together with the milk tube via the clamping body. This ensures the outlet opening is always in a permissible position.

Figures 11, 12:
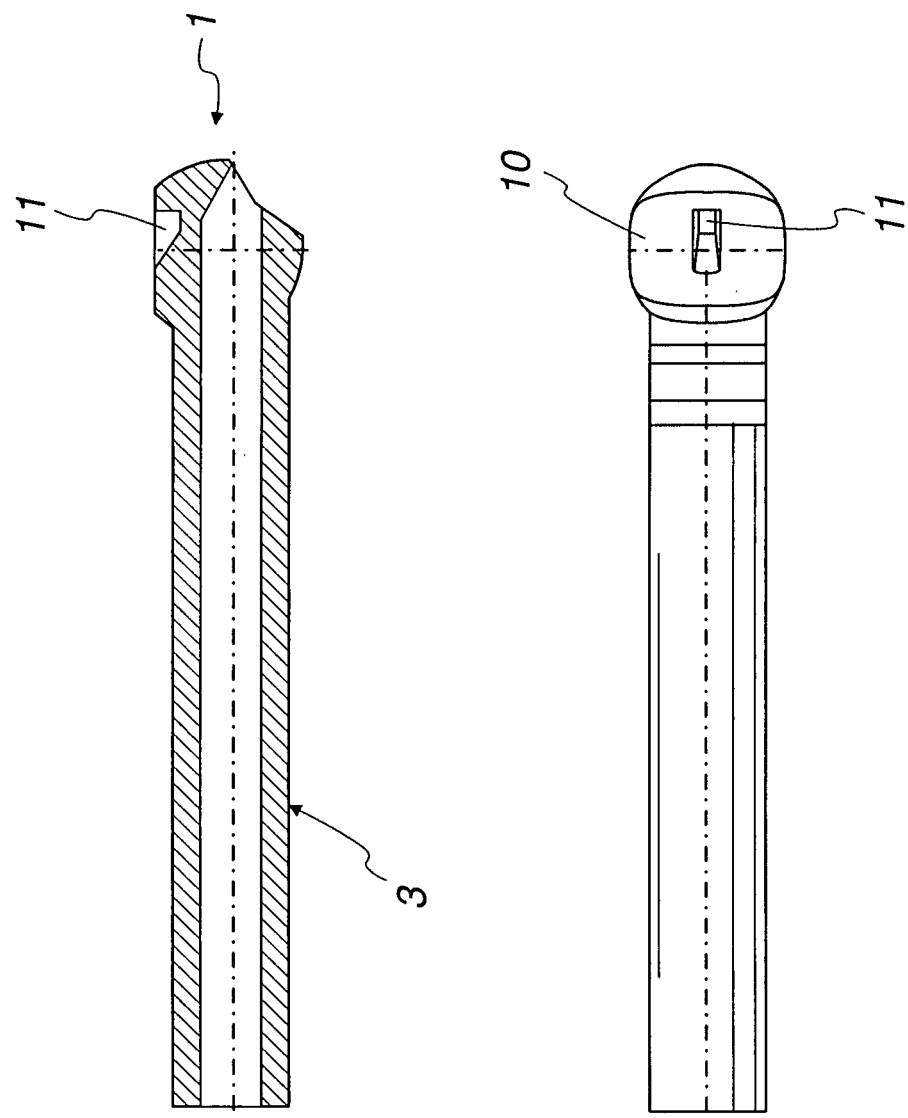
FIG. 11 shows a third exemplary embodiment of a milk tube in section.
FIG. 12 shows the milk tube according to FIG. 11 with a clamping unit.

FIGS. 11 and 12 illustrate a further exemplary embodiment of a milk tube according to the invention. The milk tube 3 has an essentially spherical clamping body 7. The clamping body 7 has a region 10. The region 10 forms a circumferential surface which is of essentially elliptical design. With regard to the illustration of FIG. 11, the centre point of the spherical clamping body 7 is spaced apart upwards from the longitudinal axis of the milk tube. This leads to a significantly better overlapping of the ball from above with the same ball diameter. This is in particular desirable and advantageous for as large a movement clearance as possible in the region of the sealing surface. A central introduction of force to the milk-collecting component in the direction of the axis of symmetry of the clamping jaw, which serves as the second sealing surface, is thus ensured in many positions. The elliptical shape affords the advantage that the clamping body is narrower laterally, which is better for the dimensioning in the clamping unit.

At the same time, because of the upwardly directed, larger radius of the ellipse, the supporting border of the clamping body in the region of greatest stress, which occurs whenever a teat cup is connected to the milk tube and hangs downwards, is greater in the engagement region of the clamping jaw of the clamping unit than in the case of a simple cylindrical region 10. The risk of the clamping body slipping out of the clamping jaw under stress is thus minimized. The milk tube can be formed as a single piece with a teat rubber.

Figure 13:
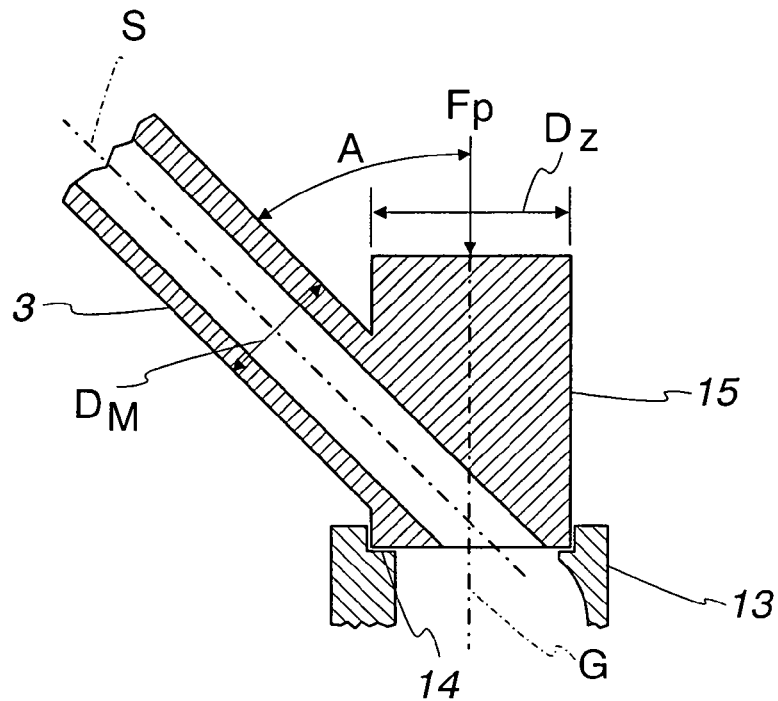
FIG. 13 shows a fourth exemplary embodiment of a milk tube in a front view.
Figure 14:
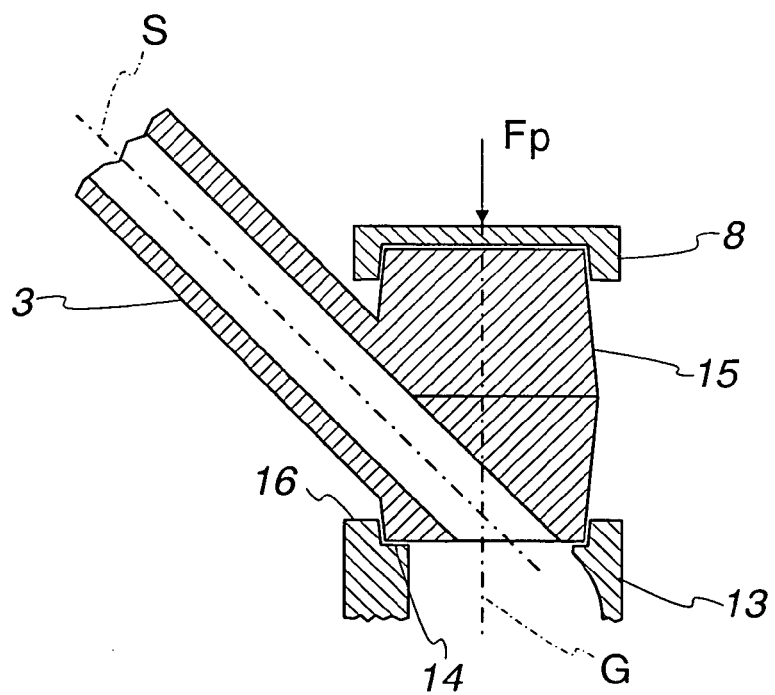
FIG. 14 shows the milk tube according to FIG. 13 in a perspective view.

FIGS. 13 and 14 illustrate a further exemplary embodiment of a clamping connection between a milk tube 3 and a milk-collecting component. A connection 13 which has a sealing seat 14 is provided with the milk-collecting component. The milk tube 3 has a clamping body 15 which essentially is of cylindrical design. The longitudinal axis of the clamping body 15 runs essentially coaxially with respect to the axis of articulation G. The sealing seat 14 has a geometry which is matched to the clamping body 15. It is apparent from the illustration according to FIGS. 11 and 12 that the longitudinal axis S of the milk tube 3 intersects the axis of articulation G at an angle A. The position of the teat cup can be changed by pivoting the milk tube 3 about the axis of articulation G.

The clamping body 15 is preferably of at least partially elastic design. Application of a clamping force $F_P$ to a clamping unit 8 firstly locks the clamping body 15 in a predetermined position and secondly produces a fluid-tight connection between the clamping body and the connection 13. The connection 13 preferably has an encircling collar 16 against which part of the circumferential surface of the clamping body 15 can come to bear when the latter is subjected to the clamping force $F_P$, as a result of which the fluid-tight connection between the clamping body 15 and the connection 13 can be further improved. The clamping body 15 can be connected releasably to the milk tube. A configuration in which the clamping body and the milk tube are formed as a single piece is preferred. In this case, the clamping body can be formed from a different material than the milk tube.

The cylindrical configuration of the clamping body 15 constitutes a preferred embodiment of the clamping body. This is not absolutely necessary. The clamping body may also have a polygonal cross section. If appropriate, the connection 13 has a shape which is matched to the polygonal cross section such that the milk tube can be adjusted or the clamping body 15 pivoted in predetermined angle steps about the axis of articulation G. The angle steps may be identical or different.

Figure 15:
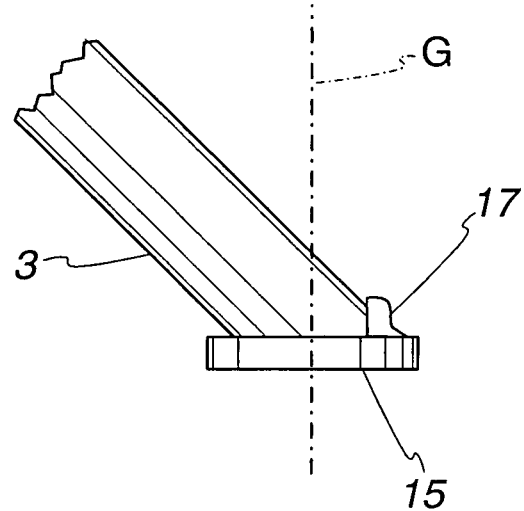
FIG. 15 shows, in a perspective view, a milk-collecting component with milk tubes.
Figure 16:
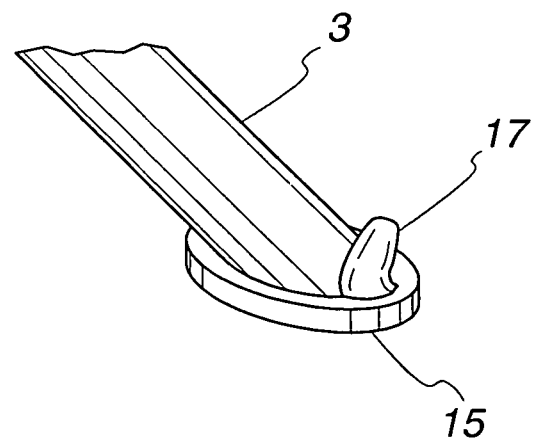
FIG. 16 shows an exemplary embodiment of the milk tube according to FIG. 15.

Another embodiment of a milk tube 3 with a clamping body 15 is illustrated in FIGS. 15 and 16. The milk tube 3 has a clamping body 15 of essentially disc-shaped design. To limit the pivoting angle about the axis of articulation G, a stop 17 is provided which can be pivoted between two stops (not illustrated) which are formed on the milk-collecting component. To fix the milk tube, a clamping unit (not illustrated) can be provided, said clamping unit being of essentially annular design such that said clamping unit exerts a clamping force on the clamping body 15. Corresponding cutouts through which the stop 17 extends can be provided within the clamping unit which is of annular design. By this means, an angular adjustment can be undertaken in discrete steps. The cutouts in the clamping unit which is of essentially annular design can be produced by punching-out actions.

Figure 17:
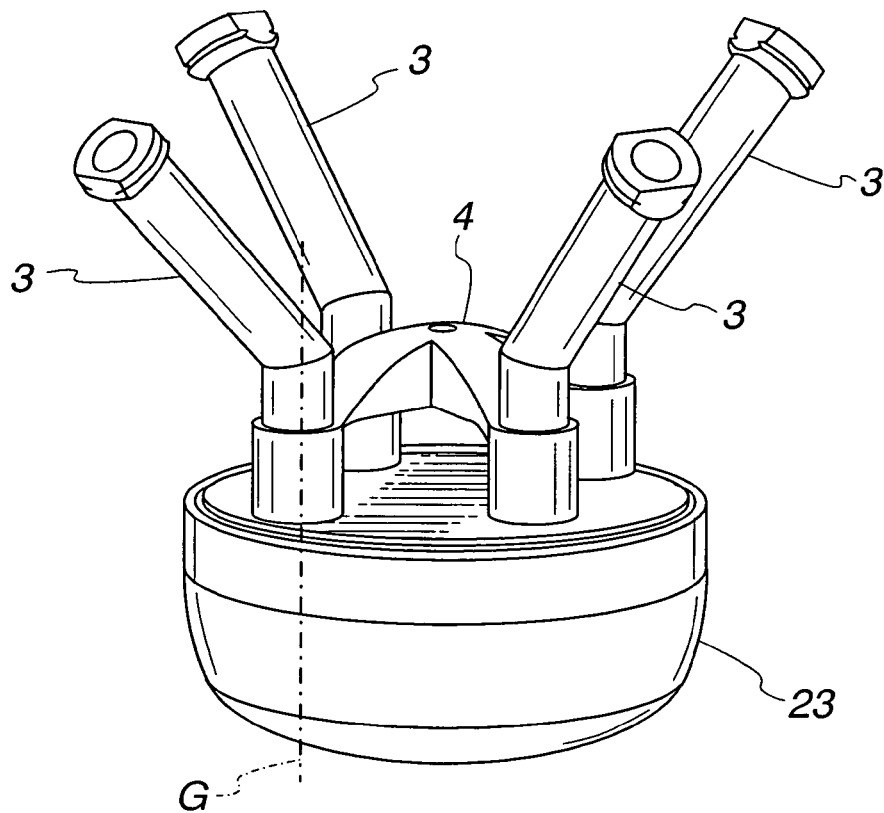
FIG. 17 shows a clamping unit in a top view.

FIG. 17 shows an exemplary embodiment of a milk-collecting component 23 in connection with milk tubes 3. The milk tubes 3 are fixed to the milk-collecting component 23 via a common clamping unit 4. The milk tubes 3 are pivotable about corresponding axes of articulation G.

Figure 18:
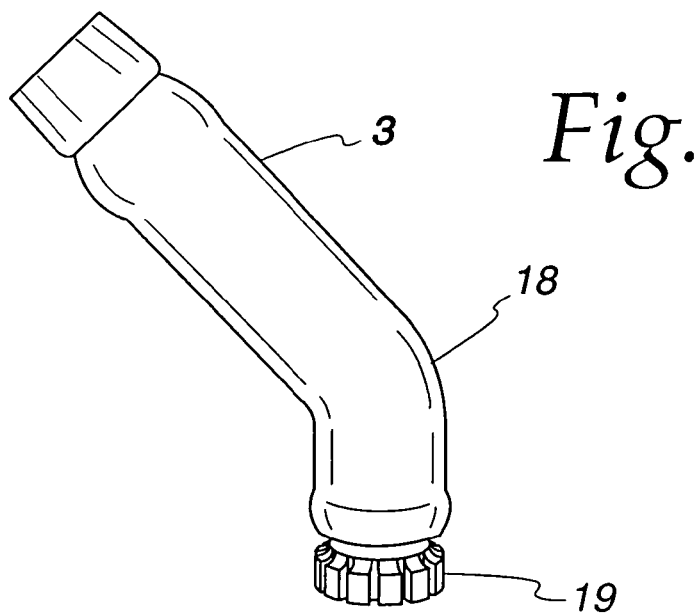
FIG. 18 shows the clamping unit according to FIG. 17 in a perspective view.

It is apparent in particular from FIG. 18 that the milk tube 3 has a curved section 18. That end region of the milk tube 3 which is adjacent to the curved section 18 has a clamping body 19 which is brought—indirectly or directly—to bear against the milk-collecting component. The clamping body 19 interacts with the clamping unit 4 such that a fluid-tight connection is produced between the milk tube 3 and the milk-collecting component 23 when a sufficient clamping force is applied to the clamping body 19 via the clamping unit 4.

The clamping body 19 can have at least one radially outwardly directed projection which projects into a corresponding cut-out in the clamping unit, with the extent of the cut-out, as viewed in the circumferential direction, being larger than the width of the projection such that the capability of the milk tube to pivot within a certain angular range is restricted.

Figure 19:
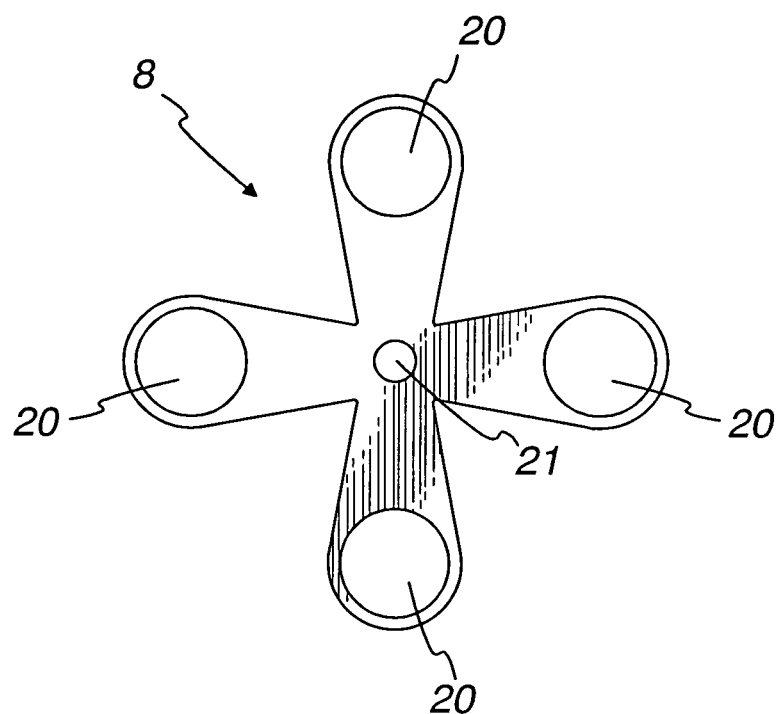
FIG. 19 shows the milk-collecting component with milk tubes in a sectional view.
Figure 20:
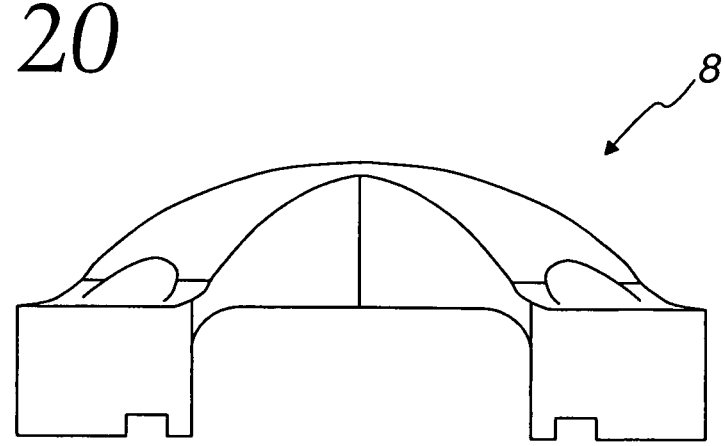
FIG. 20 shows the milk-collecting component with milk tubes according to FIG. 15, schematically in a top view.

FIGS. 19 and 20 show an embodiment of a clamping unit 4. The clamping unit 4 has passages 20. A milk tube 3 extends through a passage 20. It is apparent from the illustration according to FIG. 19 that a passage bore 21 through which a connecting means (not illustrated) can be connected to the milk-collecting component is provided in the centre of the clamping unit 4.

Figure 21:
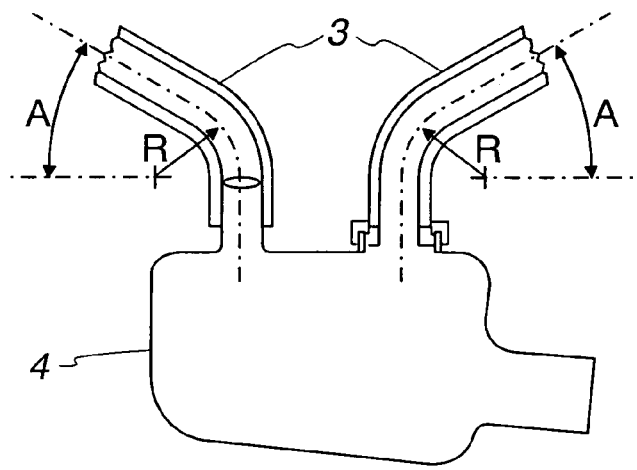
FIG. 21 shows a further exemplary embodiment of a milk tube in a sectional view.
Figure 22:
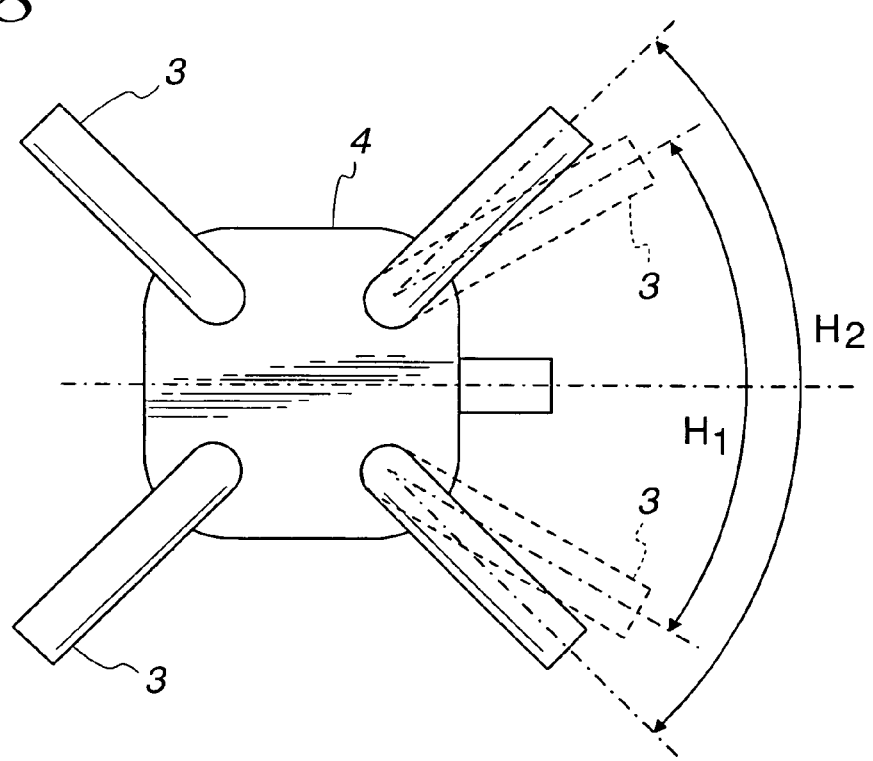
FIG. 22 shows the milk tube with a clamping unit in a perspective view.

The pivotability of the milk tubes 3 is illustrated in FIGS. 21 and 22. The milk tubes can be correspondingly oriented individually. The configuration of the clamping unit also enables a plurality of milk tubes to be correspondingly oriented in one working step.

The curved section 18 of the milk tube 3 has a radius of curvature R. Different radii of curvature R can be provided. For example, a pair of milk tubes which connect teat cups for the milking of the front teats to the teat cups for the rear teats can have different radii of curvature.

Figure 23:
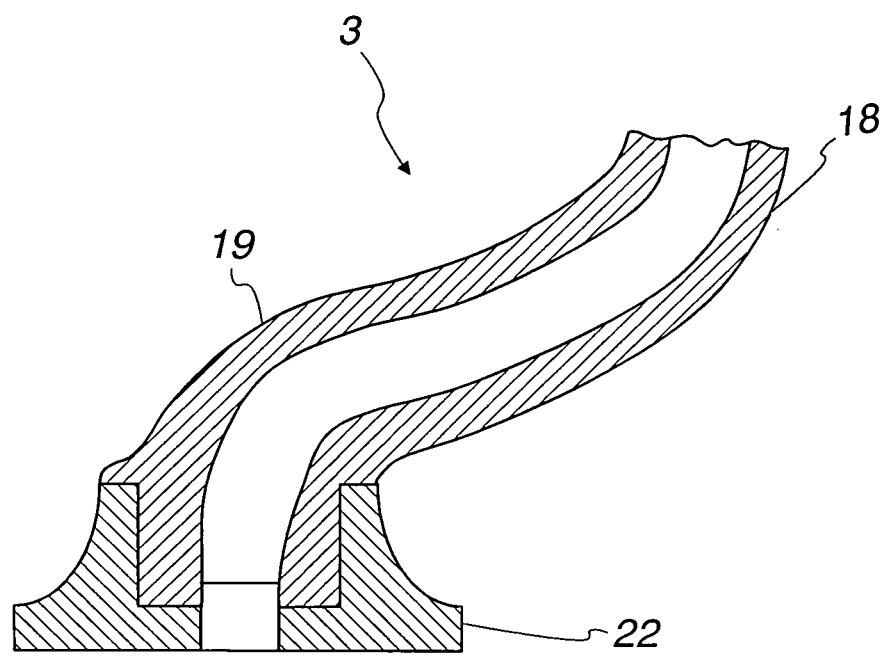
FIG. 23 shows the milk tube according to FIG. 22 in section.

In another improvement in the adjustability, the milk tube 3 can also have a plurality of curved sections, as apparent from FIG. 23.

FIG. 23 furthermore illustrates that an end section of the milk tube 3 is equipped with an adaptor 22 which forms a clamping body.

By means of the invention, essentially no forces or moments are introduced into the teats or into the udder floor by the teat cups. This has a positive influence on the milking performance of the animals.

Figure 24:
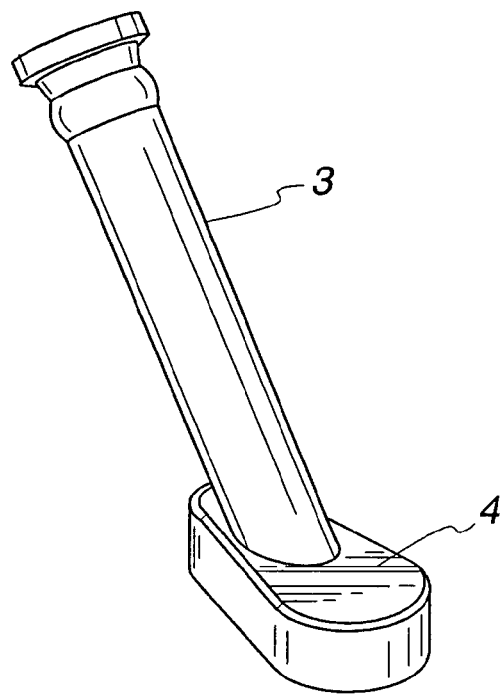
FIG. 24 shows a milk tube 3 with a clamping unit in a perspective view.
Figure 25:
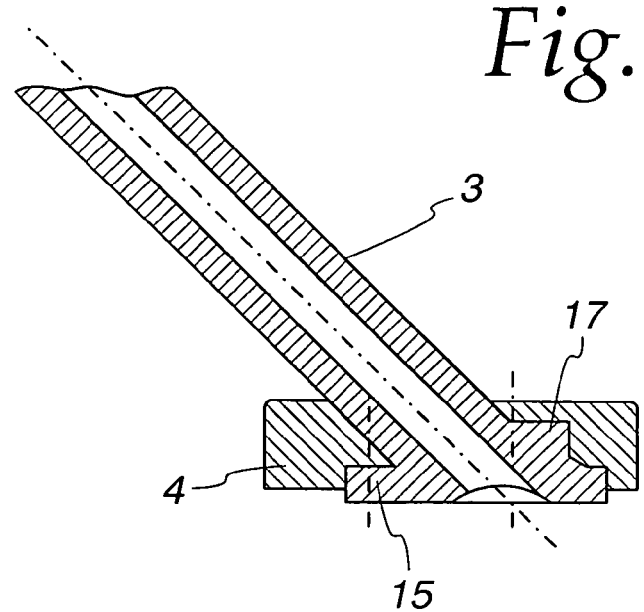
FIG. 25 shows the milk tube and the clamping unit in section according to FIG. 24.

Another configuration of a clamping connection is illustrated in FIGS. 24 and 25. The milk tube 3 has an asymmetrically designed clamping body 15. The clamping jaw engages around the clamping body 15.

At least one milk tube is formed from an elastic material. This may be, for example, silicone (LSR or HTV), rubber or TPE. The milk tube can be formed as a single piece, preferably as a single part, with a teat rubber.

Figure 26:
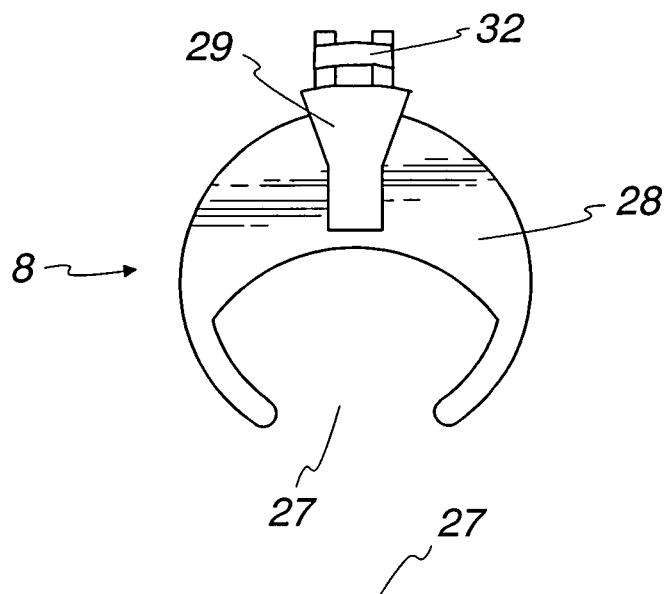
FIG. 26 shows a clamping jaw in a top view.
Figure 27:
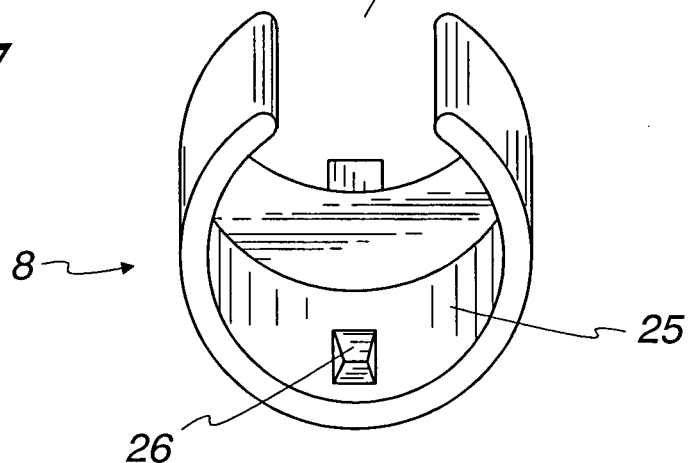
FIG. 27 shows the clamping jaw according to FIG. 24 in a perspective view from below.
Figure 28:
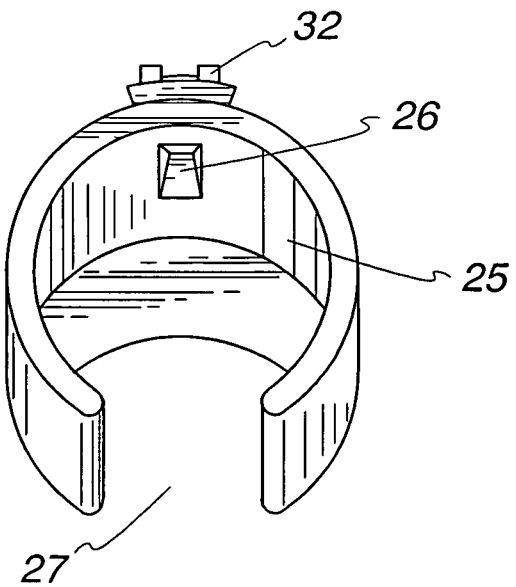
FIG. 28 shows the clamping jaw according to FIG. 24 in a perspective view from below.

FIGS. 26 to 28 illustrate an exemplary embodiment of a clamping jaw 8. The clamping jaw 8 has a receiving space 25 which serves to receive at least one part of a clamping body. The receiving space has a shape which is matched to the shape of the clamping body. It is apparent from the illustration in FIGS. 27 and 28 that the clamping jaw 8 has a projection 26 which, in the fitted state, engages in a corresponding recess which can be designed, for example, in the form of a groove 11. In the exemplary embodiment illustrated, the projection 26 is of essentially wedge-shaped design.

The clamping jaw 8 has an aperture 27. The aperture 27 is designed in such a manner that it is matched to the outer contour of a milk tube. In the fitted state, a milk tube extends through the aperture 27. The shape and design of the aperture 27 influence the position of the milk tube relative to the milk-collecting component. In the exemplary embodiment illustrated, the aperture 27 is of essentially C-shaped design. The milk tube can be passed through the open side of the C-shaped aperture 27 such that the clamping body can engage in the receiving space 25 of the clamping jaw 8. This simplifies the installation of the clamping jaw 8 with the milk tube which has a clamping body.

Figure 29:
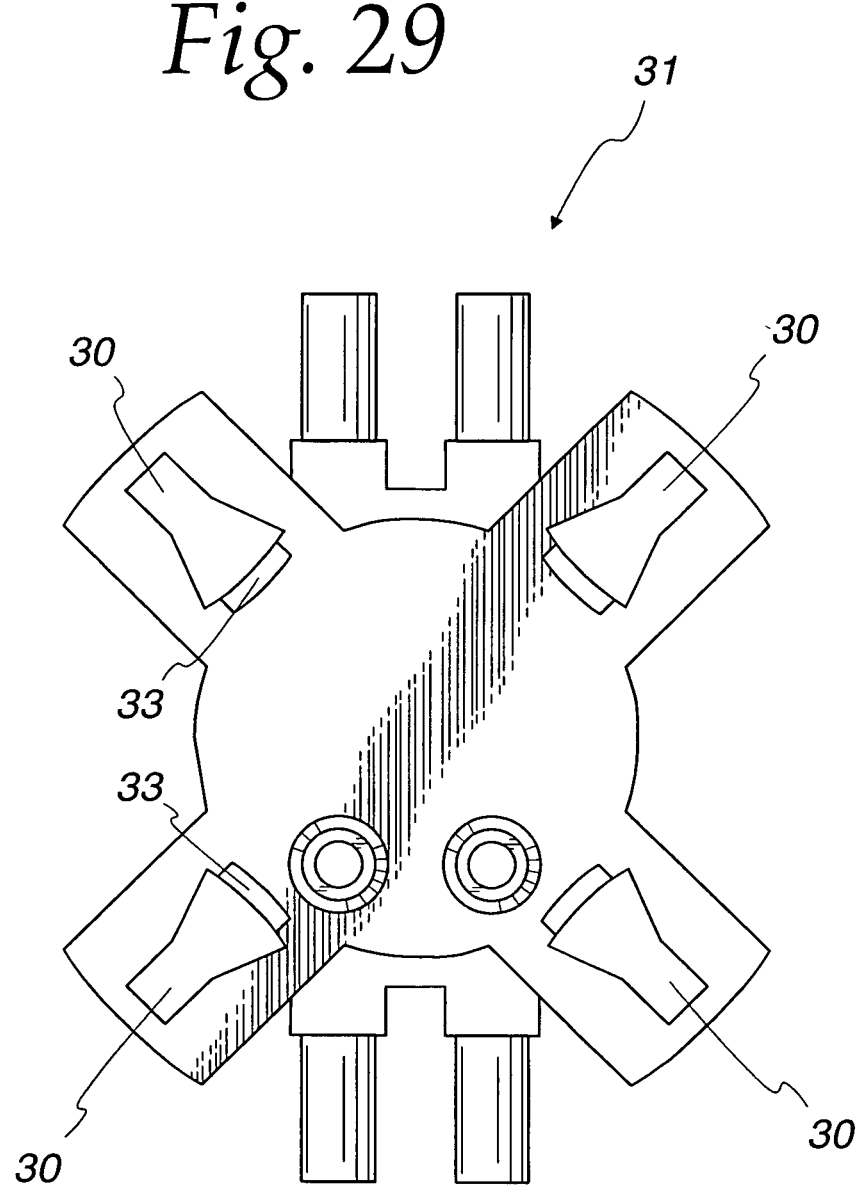
FIG. 29 shows a supporting body.

The clamping jaw 8 can be connected to a supporting body by means of a releasable latching connection. The clamping jaw 8 has, on its upper side, a depression 28 which restricts a connecting element 29. The connecting element 29 engages in a corresponding receptacle of a supporting body. The receptacle is referred to in FIG. 29 which illustrates the supporting body 29 by the designation 30. It is apparent from the illustration in FIGS. 24 and 26 that a latching element 32 which interacts with a correspondingly designed latching means 33 of the supporting body 31 is provided. The latching connection is configured in a releasable manner such that the supporting body 31 can be provided with differently designed clamping jaws 8.

The invention claimed is:
1. A milk tube comprising:
an end; and
a releasable clamping body that is substantially spherical in shape and joined to the end, the releasable clamping body having a center lying offset with respect to a longitudinal axis of the milk tube.
2. The milk tube of claim 1, wherein at least one part of the clamping body has a cross section that is substantially elliptical in shape.
3. The milk tube of claim 1, wherein the clamping body has a region with a substantially cylindrical surface area.
4. The milk tube of claim 1, wherein the clamping body defines a duct with an outlet, the outlet has an outlet axis that is disposed at an angle to the milk tube axis, and the angle is different from 90°.
5. The milk tube of claim 1, wherein the clamping body has a surface area that is substantially elliptical in shape.
6. The milk tube of claim 1, wherein the clamping body is formed integrally with the milk tube.

* * * * *